United States Patent [19]

Kumar et al.

[11] Patent Number: 4,839,789
[45] Date of Patent: Jun. 13, 1989

[54] PROGRAMMABLE CONTROL DEVICE FOR HIGH SPEED PROCESSING OF DATA

[75] Inventors: Shalabh Kumar, Kildeer; Duane S. Edgar, Schaumburg, both of Ill.

[73] Assignee: Microfast Controls Corp., Carol Stream, Ill.

[21] Appl. No.: 46,229

[22] Filed: May 4, 1987

Related U.S. Application Data

[63] Continuation-in-part of Ser. No. 740,669, Jun. 3, 1985, Pat. No. 4,744,022.

[51] Int. Cl.⁴ ............................................. G06F 15/46
[52] U.S. Cl. ................................ 364/142; 364/167.01; 364/900
[58] Field of Search .................... 364/130, 140–147, 364/167–171, 474, 475, 200 MS File, 900 MS File

[56] References Cited

U.S. PATENT DOCUMENTS

| | | | |
|---|---|---|---|
| 4,007,028 | 2/1977 | Bublitz et al. | 364/142 X |
| 4,158,226 | 6/1979 | Struger et al. | 364/900 |
| 4,242,621 | 12/1980 | Spaulding | 364/142 X |
| 4,401,930 | 8/1983 | Kato et al. | 364/167 X |
| 4,470,108 | 9/1984 | Kato et al. | 364/167 |
| 4,511,884 | 4/1985 | Serev et al. | 364/900 X |

Primary Examiner—Joseph Ruggiero
Attorney, Agent, or Firm—Thomas R. Vigil

[57] ABSTRACT

The programmable control device is arranged to accept numerical data information from a transducer associated with a particular machine. Selected outputs are stored in addressable tables, including an I/O address table, relative to outputs which are of special interest in a program and which are to be supplied to output devices. The programmable control device, utilizing a micro-computer, responds at high speed to the numerical data and status information from the input devices, selects or calculates the appropriate output, generates visual displays, and periodically couples the addressable tables to the output devices.

The control device only requires a scan time of approximately 100 to 500 microseconds and achieves the high speed by processing input data, storing selected output data in addressable tables, and periodically coupling the addressable tables to the output devices.

52 Claims, 4 Drawing Sheets

FIG. 4 EXAMPLE LADDER LOGIC PROGRAM

```
                                                  200   SCALE FACTOR
1 +--------------------------------------(SF)-+   INSTRUCTION
                                        SF  359
                                        TOP 600

201   STATIC OFFSET
2 +-------------------------------------(OFS)-+   INSTRUCTION
                                        OFS +120
                                        ANG 000

202   RATE OFFSET
3 +-------------------------------------(ROF)-+   INSTRUCTION
                                        ROF +056
                                        RPM 000

203   PLS SETPOINT
4 +-------------------------------------(PLS)-+   INSTRUCTION
                                        ON  010
                                        OFF 088

204
5 +-------------------------------------(PLS)-+
                                        ON  045
                                        OFF 121

205
6 +-------------------------------------(PLS)-+
                                        ON  197
                                        OFF 288

206
7 +-------------------------------------(PLS)-+
                                        ON  277
                                        OFF 336

114   <- LOGICAL INPUT INSTRUCTION      010
8 +-] [---------------------------------( )-+     NORMAL
     00      LOGICAL OUTPUT INSTRUCTION-> 00
    206                                      011   LADDER
9 +-| |---------------------------------( )-+
    PLS   PLS EXAMINE INSTRUCTION          00    EXECUTION

10+-----------------------------PLS ZONE -+      START OF
                                                 PLS ZONE
    203                                      012
11+-| |---------------------------------( )-+
    PLS                                      00
    204  114  114                            013
12+-| |--] [--] [---------------------( )-+
    PLS  01   02                            00
    203  114            <- EXAMPLE OF LOGICAL INPUTS
  +-| |--]/[-+             COMBINED WITH PLS EXAMINE
    PLS  01                    INSTRUCTIONS
    204  114  114                            014
13+-| |--] [--] [---------------------( )-+
    PLS  01   02                            00
    203  114  114
  +-| |--]/[--] [-+
    PLS  01   03

14+-----------------------------PLS ZONE -+      END OF
                                                 PLS ZONE
    114                                      015
15+-] [---------------------------------( )-+    NORMAL
     04                                      00
    114                                      016
16+-] [---------------------------------( )-+    LADDER
     05                                      00
    114  205                                 020
17+-] [--| |----------------------------( )-+
     10  PLS                                 00
    114                                      021   EXECUTION
18+-] [---------------------------------( )-+
     11                                      00

19 END 300
```

FIG. 5 CAMDEX ARRANGEMENT EXAMPLE

| Position | Value |
|---|---|
| POSITION 0 | 0 |
| 1 | 0 |
| | 0 |
| POSITION 20 | 1 |
| 21 | 1 |
| | 1 |
| POSITION 35 | 2 |
| 36 | 2 |
| | 2 |
| POSITION 50 | 3 |
| 51 | 3 |
| | 3 |
| POSITION 60 | 4 |
| 61 | 4 |
| | 4 |
| POSITION 75 | 5 |
| 76 | 5 |
| | 5 |
| POSITION 120 | 6 |
| 121 | 6 |
| | 6 |
| POSITION 140 | 7 |
| 141 | 7 |
| | 7 |
| POSITION 220 | 8 |
| 221 | 8 |
| | 8 |
| POSITION 245 | 9 |
| 246 | 9 |
| | 9 |
| POSITION 620 | 10 |
| 621 | 10 |
| | 10 |
| POSITION 700 | 11 |
| 701 | 11 |
| | 11 |
| POSITION 845 | 12 |
| 846 | 12 |
| | 12 |
| POSITION 875 | 13 |
| 876 | 13 |
| | 13 |
| POSITION 930 | 14 |
| 931 | 14 |
| | 14 |
| POSITION 1000 | |

PROGRAMMABLE CONTROL DEVICE FOR HIGH SPEED PROCESSING OF DATA

CROSS REFERENCE TO RELATED APPLICATIONS

This application is a continuation-in-part of our prior copending application Ser. No. 740,669, filed June 3, 1985 U.S. Pat. No. 4,744,022 for: PROGRAMMABLE CONTROL APPARATUS INCLUDING AN ABSOLUTE POSITION TRANSDUCER.

BACKGROUND OF THE INVENTION

1. Field of the Invention

The present invention relates generally to a programmable control device typically used in industrial environments for controlling production of a machine and/or a process. A programmable control device uses as its inputs the states of switch-type devices and the input of numerical data from various sources such as but not limited to: position transducers, pressure sensors, liquid flow or passage of time. From these inputs, along with the user's program, the programmable control device computes logical outputs in the form of electronic switch outputs. These outputs typically cause the starting and stopping of desired functions at predetermined times and locations during a machine cycle or a production process.

2. Description of the Prior Art

Prior methods for providing the control signals to the desired outputs have generally operated by sequential analysis of a ladder logic diagram or program. In general, a ladder logic diagram is both read and executed from left to right and from the top down to the end of the machine or process control program. Each line of the ladder program is called a rung. The ladder diagram instructions fall into two general types of instructions: switch (bit) and data (word). There are individual instructions for input or output that operate on bits or words. Each ladder instruction refers to either a bit or a word of memory. In general, with bit instructions, each input instruction on a rung is evaluated to be either true or false. If the logical result of the input instructions are true then the single allowable output instruction on the rung is also true.

The particular bit in memory to which the output instruction refers is then changed to reflect the logical result of the input instructions.

Two special areas in a programmable control device's memory are reserved to coincide with the physical inputs and outputs: these are called an input status section and an output status section, respectively.

Bit instructions can be combined with word instructions to allow the programmable control device to perform arithmetic calculations, numerical comparisons and the transfer of data to different memory locations, among other functions.

In a prior art programmable control device, the logical condition or the data from all of the inputs is placed in the input status section. The programmable control device then sequentially and serially scans each logical condition, one at a time, and transfers the resultant bits and data to its output status section and then to the physical output devices. The total time to process one ladder, i.e., the scan time, is dependent upon the number of logical decisions to be processed and a larger number of decisions requires a longer scan time. This approach has been used successfully by the prior art control devices in many applications. However, where extensive calculations or higher speeds have been required, these prior control devices have proven to be too slow for the machinery they are controlling.

The present invention differs from the prior art control devices in its speed of response which is one to two orders of magnitude faster than the speed of response for prior art control devices. While the prior art scan time ranges from 20 to 500 milliseconds to process a change in the outputs of a prior art control device as a result of a change in transducer-position-indicating numerical input data, the control device of the present invention only requires a scan time of approximately 100 to 500 microseconds to achieve similar results. The control device of the present invention achieves the higher speed by processing input data, storing selected output data in addressable tables some of which have addresses including the changing, transducer-position-indicating, numerical, input data, and periodically coupling all the tables to the output devices.

SUMMARY OF THE INVENTION

According to the invention there is provided a programmable control device that is arranged to accept numerical data information from a transducer associated with a particular machine. Selected outputs are stored in addressable tables, including an I/O address table, relative to outputs which are of special interest in a program and which are to be supplied to output devices. The programmable control device, utilizing a micro-computer, responds at high speed to the numerical data and status information from the input devices, selects or calculates the appropriate output, generates visual displays, and periodically couples the addressable tables to the output devices.

To attain a high speed of response to changes in numerical data (such as a change in shaft position), several special instructions are inserted into a ladder program. The first of such instructions is a data instruction called a PLS Setpoint, whose function is to allow the ladder programmer to define a numerical range of interest which corresponds to transducer output data values. The second of such instructions is a Scale Factor instruction that allows the ladder programmer to define the maximum range he wishes his transducer to indicate. (The scale factor, for example, might allow a position transducer to indicate degrees of rotation by setting the scale factor to 359.) The third of such instructions are offsets which can be added to the transducer to calibrate the transducer values for the machine or process and compensate for the rate of change of the transducer's data. The fourth group of such instructions are PLS Examine instructions that evaluate true (e.g., PLS on between 300 and 310) if the transducer's numerical data indicating the transducer position falls within that numerical range as the PLS Setpoint to which a PLS Examine instruction refers. The fifth of such instructions is a PLS Zone instruction which allows the ladder programmer to select a set of ladder rungs for nonsequential, rapid execution, i.e., coupling selected tables to the outputs.

If the ladder program contains a PLS Zone, special processing of the ladder rungs occurs. The program scans the PLS Setpoints and converts them with the Scale Factor value to a binary format corresponding to the numerical format of the input transducer data. The input transducer's maximum numeric value also corresponds to the length of a table of index data. Next the instructions in the PLS Zone(s) are evaluated and each output bit's numerical range that is true is marked with an "on" point (beginning) and an "off" point (end).

In the preferred embodiment, the on and off points include transducer position, the scale factor and status information from input devices. All of the on and off points for each bit are then combined in the order of the data range of the transducer in such a manner that all of the unique changes of the programmable control device's outputs with respect to the input transducer data are accounted for by a unique number (state number) at each location in the tables of index data. The state numbers in a unique range will be the same. In other words, suppose that the range of the input transducer is from 0 to 1000. Output 01000 turns on at 20 (e.g., 20°) and turns off at 50 (e.g., 50°), output 01001 turns on at 35 and turns off at 75, output 01002 turns on at 60 and turns off at 140, output 01002 turns on at 120 and off at 245, output 01004 turns on at 220 and off at 700, output 01005 turns on at 620 and turns off at 845 and output 01006 turns on at 875 and off at 930. Such a table of index data (hereinafter Camdex table) would then be arranged as in FIG. 5.

The state numbers entered into the Camdex are used as a further index into another table (hereinafter the Cam Table) which contains all of the various data for all of the output status section locations used for each Camdex state number. This data is re-arranged in an I/O address table. Each block of the I/O address table is arranged in the same order as the output status section addresses themselves.

In the control device of the present invention each time the data from the transducer changes value (a change in numerical data), the processing of the normal ladder program is interrupted and the numerical output of a transducer is read, the offsets are added, and an index address is developed. In one preferred embodiment, the index address and the state data contained therein includes transducer position, the scale factor, the offset, and status information from input devices. This address (e.g., 100) is used as an offset to the base address (3000) of the Camdex table to identify a predetermined state of operation at address 3100, and the state data (10) read from the Camdex table is used to address the output data table (Cam Table). The data from the Cam Table is the output data that is used to update the output status section which is coupled to the output devices.

BRIEF DESCRIPTION OF THE DRAWINGS

FIG. 4 is a layout of an example of a ladder logic program used by the programmable control device shown in FIG. 1 for generating control signals.

FIG. 5 is a layout of an example of an arrangement within a memory of index data (Camdex Table) generated in accordance with the teachings of the present invention.

DESCRIPTION OF THE PREFERRED EMBODIMENT

Figure 1:
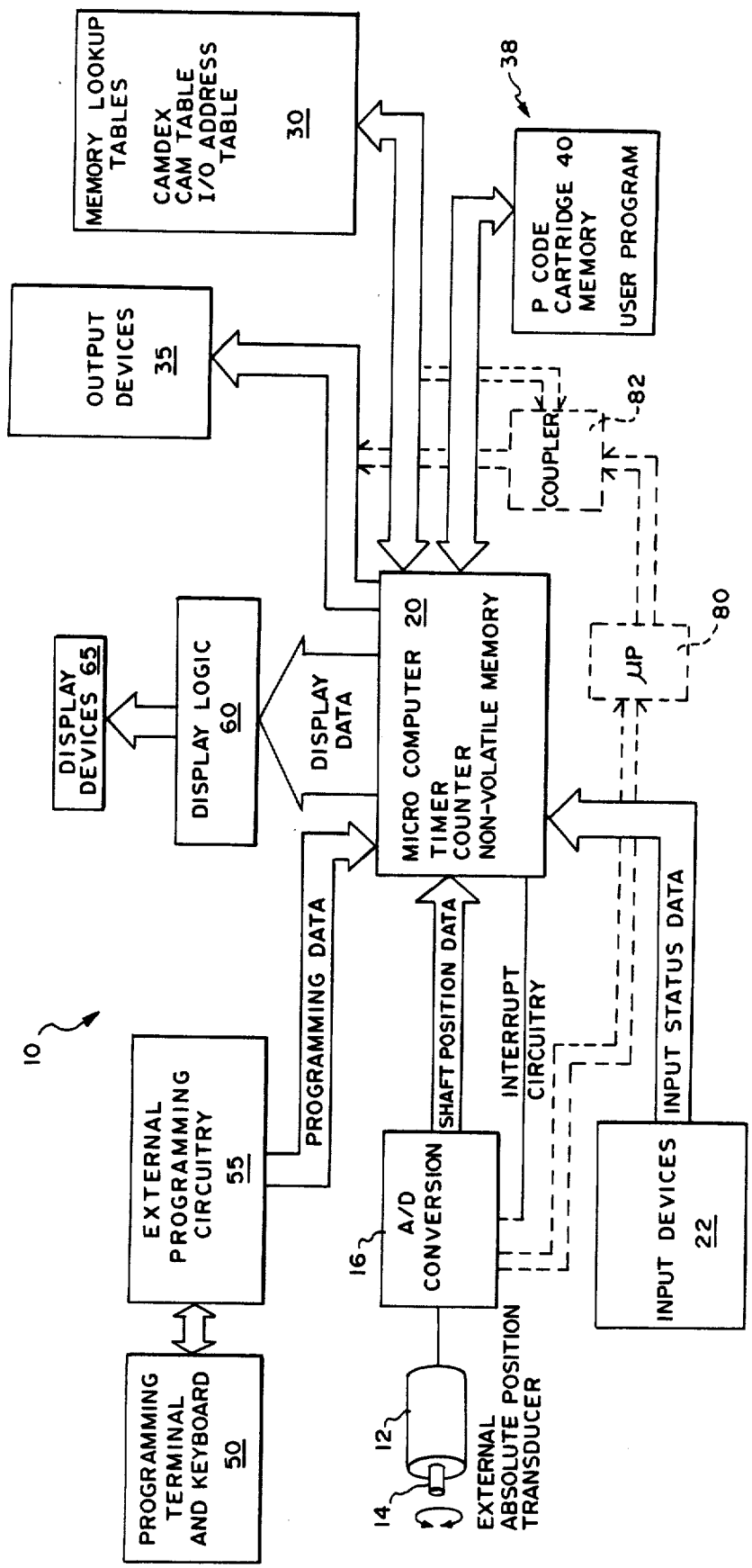
FIG. 1 is a block diagram of one embodiment of the programmable control device of the present invention including a programming terminal, position transducer, micro-computer, output devices, user program cartridges, and look-up tables.

Referring now to the drawings in greater detail, there is illustrated in FIG. 1 a block diagram of a programmable control device 10 constructed according to the teachings of the present invention, and including a position transducer 12 having a shaft 14 arranged to be mechanically coupled to a machine shaft. Of course, other control inputs such as from a pressure transducer, a liquid flow sensor or the passage of time can be used. The transducer 12 is typically arranged to provide an analog signal which is converted to a digital format by a ratiometric tracking converter or A/D conversion circuitry 16. A typical position transducer 12 may comprise a resolver encoder mounted on a machine shaft of the type sold under Model No. RL100 by Autotech Corporation of Carol Stream, Ill. The conversion circuitry 16 is provided to generate a digital representation of the transducer output for input to a micro-computer 20.

Figure 2:
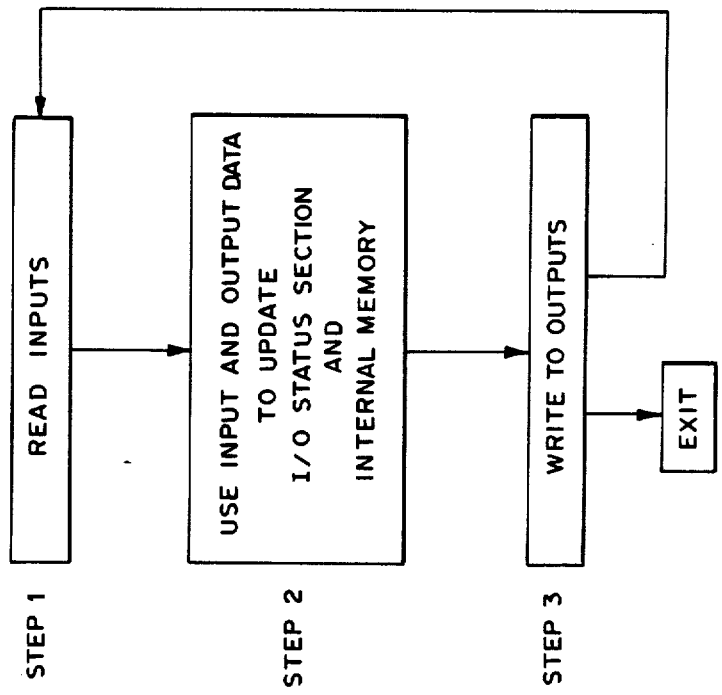
FIG. 2 is a flow diagram of the basic operation of the control device of, the present invention as depicted in FIG. 1.

Referring now to FIG. 2 there is shown the basic flow chart of operation of the micro-computer 20.

In step 1 the micro-computer 20 is instructed to read the machine inputs including status information from position and input devices 22.

In step 2 the input data read in step 1 and the output data calculated by the processor of the micro-computer 20 is used to update I/O status sections or memory lookup tables 30 in accordance with instructions in the user program and to update internal memory of the microcomputer.

In step 3 the micro-computer writes the data from the I/O status sections to the output devices. The system then loops back to the beginning until finally instructed to exit.

Figure 3:
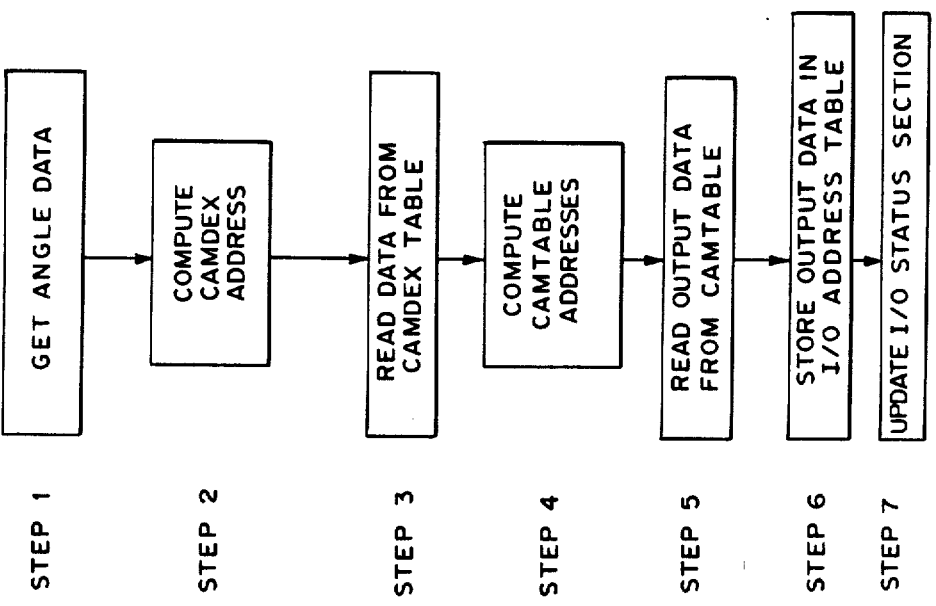
FIG. 3 is a flow diagram of the operation of the programmable control device shown in FIG. 2 in utilizing the look-up tables to achieve high speed resolution of the logic input states at predetermined angles.

A flow chart of the method by which the control device 10 accesses and retrieves data from the lookup tables 30 is illustrated in FIG. 3 and may be described as follows:

In step 1, when a numeric change of the input transducer 12 interrupts the process depicted in FIG. 2 above, the microcomputer 20 fetches the angle data (numerical data) from the transducer 12 and adds the offsets.

In step 2 an index address is developed from this numerical data, and this address is used to enter a memory location in a table of indexes, hereinafter referred to as the Camdex table.

The index or state number contained in each location of this memory is arranged to correspond to the output data desired for each transducer datum in logical combination with the switch input devices 22 for the rungs of a ladder in the zones of a ladder logic program shown in FIG. 4. In such a program a series of logic operations are called for, such as to examine the condition of certain switches and to combine these logic states with the desired transducer values to compute a logic output.

In step 3 the predetermined logic state is identified and read from the Camdex table.

In step 4 the micro-computer 20 calculates an address location for entry into the Cam Table. In this table a unique set of outputs is provided for individual output devices 35 for any given set of input conditions. For multiple outputs there is provided a sequential array of output data corresponding to an array of output devices 35.

In step 5 the output data is read from the Cam Table and, in step 6, this data is re-arranged and stored in the output I/O address tables, using the output device locations contained in the I/O address tables as pointers.

In step 7 the selected output status data is then used to update the I/O status sections as well as the physical outputs.

In one embodiment of the present invention the microcomputer 20 is directed to the appropriate output data block of memory by converting the index stored in the Camdex to a memory location in the Cam Table. This is accomplished by multiplying the stored index by a total number of output devices 35 being controlled and adding that number to the base address of the Cam Table.

The position offset is defined in scale factor units and is a determined increment to be added to the transducer output to calibrate the programmable control device 10. The scale factor is defined as the number of programmable divisions in one rotation of the position transducer shaft. The address of the Camdex that is used to determine the state number is the sum of the transducer position, the position offset and a base table-address. Both the scale factor and the position offset are stored in a non-volatile memory in the micro-computer 20.

In one preferred embodiment of the present invention there is provided a memory device 38 containing the user program which is executable by the micro-computer 20. This memory is programmed with a group of user instructions having operation codes, configuration data for the programmable control device, offset data, rate offset data, on/off set points and cam numbers, and input and output addresses. The code accessed within this memory is hereinafter referred to as P-code and provides a condensed version of the user program for the micro-computer 20.

The P-code is converted to an executable routine in response to the user program and identified input conditions, and is hereinafter referred to as Q-code. In operation of the system under control of the Q-code, the user program is executed. Any change in input conditions which will, in turn, modify the data in Camdex, Cam Table, or I/O address table will cause a rapid alteration of these tables to suit the new conditions.

In operation of the device 10 under control of the user programmed P-code, the processor means of the micro-computer 20 scans the PLS Setpoints and converts them with the Scale Factor value to a binary format corresponding to the numerical format of the input transducer data. The input transducer's maximum numeric value also corresponds to the length of the Camdex table. Next the instructions in the PLS Zone(s) are evaluated and each output bit's numerical range that is true is marked with an "on" point (beginning) and an "off" point (end).

In one preferred embodiment, the on and off points include transducer position, the scale factor and status information from the input devices 22. All of the on and off points for each bit are then combined in the order of the data range of the transducer in such a manner that all of the unique changes of the programmable control device's outputs with respect to the input transducer data are accounted for by filling in a unique state number at each Camdex location. The state numbers in a unique range will be the same.

In the example of a Camdex arrangement shown in FIG. 5, the range of the input transducer is from 0 to 1000. Output 01000 turns on at 20 and turns off at 50, output 01001 turns on at 35 and turns off at 75, output 01002 turns on at 60 and turns off at 140, output 01003 turns on at 120 and off at 245, output 01004 turns on at 220 and off at 700, output 01005 turns on at 620 and turns of at 845 and output 01006 turns on at 875 and off at 930. The Camdex table would then be arranged as in FIG. 5. State 1 in position 20 indicates the state of output 01000 being on but all others off, while state 2 in position 35 indicates the state of outputs 01000 and 01001 being on but all others off.

The state numbers entered into the Camdex are used as a further index into the Cam Table which contains all of the various data for all of the output status section memory locations used for each Camdex state number. Each block of output data is then re-arranged in the I/O address table in the same order as the output status section addresses themselves.

In the control device 10 of the present invention each time the data from the transducer 12 changes value the processing of the normal ladder program is interrupted and the numerical output of the transducer 12 is read, the offsets are added, and an index address is developed. This address is used as an offset to the base of the Camdex table to identify predetermined states of operation, and the state data read from the Camdex table is used to address the Cam Table. The data from the Cam Table is the output data that is used to update the output status section location pointed to by the I/O address table for coupling to the output devices.

In accordance with yet a further aspect of the present invention there is provided a module or cartridge 40 in the memory device 38 which is user programmable and contains the aforementioned P-code. This is programmable through a programming terminal 50 and external programming circuitry 55 shown in FIG. 1. This cartridge 40 is designed to be removably connected to the micro-computer 20 for convenient interchange of cartridges and therefore also user programs. The memory in this cartridge is preferrably of the non-volatile type such that setpoint information and programs are retained without power. This permits preprogramming of various cartridge memories to provide spare modules for backup or programming changes.

A display logic 60 and associated display devices 65 are connected to the micro-computer 20 to indicate the numerical value of the position transducer and diagnostic conditions of the micro-computer 20. This display logic circuitry 60 is under the control of the micro-computer 20 and the P-code cartridge and can therefor be customized by the user program in the P-code cartridge.

High speed operation of the circuit configuration of the control device 10 shown in FIG. 1 is made possible by the use of the lookup tables 30 for predefined conditions. As a result, the time for sequential processing of the input data is avoided and the desired outputs are available immediately on sensing of the position of the transducer.

From the foregoing description, it will be apparent that modifications can be made to the apparatus and method for using same without departing from the teachings of the present invention.

For example, instead of controlling the interrupt and coupling of the addressable tables with a position transducer, one could utilize a predetermined time period.

Also, one could use a second micro-computer 80, shown in phantom in FIG. 1, for controlling the interrupt and coupling of the tables 30 to the output devices 35 while the micro-computer 20 cycles through the input data in the ladder program and periodically updates the tables 30 as required. For this purpose, the micro-computer 80 is coupled between the conversion circuitry 16 and a controllable coupling device 82. Then the micro-computer 80 controls the coupling device 82 for timely coupling of the look-up tables to the output status section as well as the output devices 35. In this modified embodiment, the interrupt circuitry between conversion circuitry 16 and micro-computer 20 would be omitted.

Accordingly the scope of the invention is only to be limited as necessitated by the accompanying claims.

We claim:

1. A programmable control device for controlling the outputs to a plurality of output devices relative to inputs from transducer means and input devices, said control device comprising:
   first means for sequentially processing input data from said inputs relative to instructions in a user program,
   second means for storing selected output data related to desired output states for different positions of the transducer means in addressable tables some of which have at least a portion of a changing transducer output as part of its address, and
   said first means being responsive to a changing transducer output for periodically coupling the addressable tables to all the output devices to control the output devices at a high speed.

2. The control device of claim 1 further comprising third means for storing the user program including information for selecting the selected output data to be stored in the addressable tables.

3. The control device of claim 2 wherein said information stored in said third means comprises PLS zones in the user program.

4. The control device of claim 1 wherein said addressable tables include data related to programmed limits corresponding to the transducer position for effecting an output ON or an output OFF signal.

5. The control device of claim 4 wherein information for determining if the transducer position is within the programmed limits is stored in said third means.

6. The control device of claim 5 wherein said information includes a PLS examine instruction in a user program stored in said third means.

7. The control device of claim 1 wherein said addressable tables include an output data table, and said first means is operable to index the addressable tables and then couple the output data table to all the output devices.

8. The control device of claim 1 wherein the addresses of said addressable tables include scale factor data.

9. The control device of claim 1 wherein the addresses of said addressable tables include offset data.

10. The control device of claim 1 wherein the addresses of said addressable tables include rate offset data related to the rate of change of numerical, position-indicating, data from said transducer electrically coupled to said control device.

11. The control device of claim 1 including a transducer electrically coupled to said control device and means for interrupting said first means for regulating processing input data in response to changes in numerical, position-indicating, input data from said transducer to allow said first means to couple the addressable tables to the output devices.

12. A programmable control device for controlling the outputs to a plurality of output devices of a machine, said control device comprising:
   a transducer coupled to the machine and having electrical circuitry for generating numerical input data corresponding to a machine variable;
   a micro-computer including a processor electrically coupled to said transducer for sequentially processing data;
   a user programmable memory arranged to store a program executable by said processor;
   input means for supplying input data to said processor for being processed relative to instructions in the user program;
   output data memory for storing selected output data in addressable tables some of which have addresses including numerical input data relating to various machine variables; and
   said processor being coupled to said user programmable memory and to said output data memory and being operable periodically in response to numerical data from said transducer to couple said output data in said addressable tables to all the output devices.

13. The control device of claim 12 further comprising information in the user program for selecting the selected output data to be stored in the addressable tables.

14. The control device of claim 13 wherein said information comprises PLS zones in the user program.

15. The control device of claim 12 wherein said addressable tables include data related to programmed limits corresponding to transducer position for effecting an output ON or an output OFF signal.

16. The control device of claim 15 including information in the user program for determining if the transducer position is within the programmed limits.

17. The control device of claim 16 wherein said information includes a PLS examine instruction in the user program.

18. The control device of claim 12 wherein the addresses of said addressable tables include scale factor data.

19. The control device of claim 12 wherein the addresses of said addressable tables include offset data.

20. The control device of claim 12 wherein the addresses of said addressable tables include rate offset data related to the rate of change of numerical data from the transducer electrically coupled to said control device.

21. The control device of claim 12 including an interrupt circuit which interrupts the sequential processing of input data by said processor in response to changes in numerical input data from said transducer, said processor in response to said interrupt being operable to couple the addressable tables to the output devices.

22. The control device of claim 12 wherein said user programmable memory comprises a removable cartridge having a nonvolatile memory.

23. The control device of claim 12 further comprising visual display means electrically coupled to said processor.

24. The control device of claim 12 further comprising a programming unit electrically coupled to said processor means and including a keyboard and programming input circuitry.

25. The control device of claim 12 further comprising digital conversion circuitry electrically coupled between said transducer and said micro-computer.

26. The control device of claim 25 comprising interrupt circuitry coupled between said digital conversion circuitry and said micro-computer, said interrupt circuitry being operable to interrupt said micro-computer and activate same to read said transducer's position upon predetermined change of the machine variable.

27. The control device of claim 26 further comprising an index data memory coupled to said processor, and wherein said processor is arranged to read an address location in said index data memory in response to said input signals, and to read a location in said output data memory in response to said data retrieved from said index data memory.

28. The control device of claim 26 wherein said address location in said index data memory comprises the digital representation of said input signal generated from said transducer.

29. The control device of claim 12 including a setpoint program in said user programmable memory.

30. The control device of claim 29 further comprising defined zones in said user program, means for processing said setpoint program for all outputs and means for storing in said output data memory the output data for all outputs for each possible input condition within each zone, which output data is accessible upon entry of the machine into said defined zones.

31. The control device of claim 12 further comprising digital conversion circuitry electrically coupled between said transducer and said micro-computer.

32. The control device of claim 31 wherein said addresses in said addressable table comprise the binary bits of said digital conversion of said input signal.

33. A method for controlling the outputs to a plurality of output devices relative to inputs from transducer means and input devices, said method comprising the steps of:
sequentially processing input data from said inputs relative to instructions in a user program;
storing selected output data relative to desired output states for different positions of the transducer means in addressable tables some of which have at least a portion of a changing transducer output as part of its address; and,
in response to a changing transducer output, periodically coupling the addressable tables to all the output devices to control the output devices at a high speed.

34. The method of claim 33 further comprising the steps of selecting the selected output data to be stored in the addressable tables.

35. The method of claim 33 including the steps of providing a user program and providing PLS zones in the user program.

36. The method of claim 35 including the step of providing a PLS examine instruction in the user program.

37. The method of claim 33 including providing in the addressable tables data related to programmed limits corresponding to transducer position for effecting an output ON or an output OFF signal.

38. The method of claim 37 including the step of determining if the transducer position is within the programmed limits.

39. The method of claim 33 including the step of providing scale factor data in addresses of said addressable tables.

40. The method of claim 33 including the step of providing offset data in addresses of said addressable tables.

41. The method of claim 33 including the step of providing rate offset data related to the rate of change of numerical data from a transducer electrically coupled to said control device in the addresses of said addressable tables.

42. The method of claim 33 including the step of interrupting the step of sequentially processing input data in response to the change in numerical input data from a transducer and then coupling the addressable tables to the output devices.

43. A method for controlling functions of a machine having output devices, a memory, a processor and a numerical transducer, comprising the steps of:
storing a user program in a first memory;
receiving input data from input devices;
processing the input data relative to instructions in the user program;
storing output data in a second memory;
reading the numerical signals generated by the transducer and being indicative of various machine variables;
developing a memory address for output data in said second memory from at least some of said transducer signals;
addressing said second memory with said developed address; and
in response to numerical data from said transducer, periodically generating output control signals from said output data and periodically coupling said output control signals to all of the output devices to cause starting or stopping of desired machine functions.

44. The method of claim 43 further comprising the step of developing said memory address by adjusting said transducer signal by scale factor and offset.

45. The method of claim 43 further comprising the step of developing said memory address by including status information of the condition of defined input devices.

46. The method of claim 43 further comprising the final step of updating the output data by sensing status information from input devices, computing the desired output data in accordance with said user program, and storing the up-dated output data in said second memory.

47. A method of controlling functions of a machine having output devices, a memory, a processor and a numerical transducer, comprising the steps of:
storing a user program in a first memory;
receiving input data from input devices;
processing the input data relative to instructions in the user program;
storing index data in a second memory;
storing output data in a third memory;
reading the numerical signals generated by the transducer;
developing an address for said second memory including the numerical signal generated by the transducer and being indicative of a machine variable;
addressing said second memory with said developed address for said second memory;
reading said index data from said second memory;

developing an address for said third memory corresponding to the index data read from said second memory;

addressing said third memory with said developed address for said third memory;

in response to changes in the numerical data, periodically generating output control signals from said output data; and in response to changes in the numerical data, periodically coupling said output control signals to all of said output devices to cause starting or stopping of desired machine functions.

48. The method of claim 47 further comprising the step of developing said index memory address by adjusting said transducer signal by scale factor and offset.

49. The method of claim 47 further comprising the step of developing said index memory address by including status information of the condition of input devices.

50. The method of claim 47 further comprises the step of developing said index address by including the digital representation of the transducer generated signal as part of said address.

51. The method of claim 47 wherein said step of developing an address for said third memory includes using the index data read from said second memory multiplied by the number of controlled output devices as part of said address.

52. The method of claim 47 further comprising the final step of updating the output data by sensing status information from input devices, computing the desired output data in accordance with said user program, and storing the up-dated output data in said third memory.

* * * * *